July 27, 1937. W. H. McCLARIN, SR Re. 20,456

THUMB GUARD AND REST FOR PISTOLS

Original Filed Aug. 13, 1932 2 Sheets-Sheet 1

Inventor

William Hugh McClarin Sr.

By Clarence A. O'Brien

Attorney

July 27, 1937. W. H. McCLARIN, SR Re. 20,456

THUMB GUARD AND REST FOR PISTOLS

Original Filed Aug. 13, 1932 2 Sheets-Sheet 2

Inventor

William Hugh McClarin Sr.

By Clarence O'Brien

Attorney

Reissued July 27, 1937

Re. 20,456

UNITED STATES PATENT OFFICE 20,456

THUMB GUARD AND REST FOR PISTOLS

William Hugh McClarin, Sr., Bethlehem, Pa.

Original No. 1,940,362, dated December 19, 1933, Serial No. 628,743, August 13, 1932. Renewed October 17, 1933. Application for reissue November 22, 1935, Serial No. 51,103

8 Claims. (Cl. 42—72)

This invention relates to the broad class of firearms and has more specific reference to appurtenances and accessories usable in conjunction with revolvers and pistols.

As the title of the invention implies, the primary novelty is predicated upon means carried by opposite sides of the shank of the pistol grip and located within the vicinity of the inner end of the rotary cylinder or magazine, wherein said means is specifically shaped and constructed to function as a thumb rest, as well as a thumb guard.

In the embodiment of the invention illustrated in the accompanying drawings, the improved means comprises a pair of duplicate units attachable to opposite sides of the pistol, each unit embodying an accurately and satisfactorily shaped portion serving primarily as a thumb rest for either right or left hand users, whereby to decidedly improve the degree of utility and practicability of the pistol.

The principal advantage and feature of the invention is that it provides dependable and effective means whereby the user may "squeeze" the shot off rather than resort to the usual uncertain pull and jerk, whereby to permit the flight of the bullet to be controlled with greater precision and dependability.

Another feature of the invention is that the presence thereof on the pistol or revolver permits the user to equalize and uniformly distribute the pressure on the index or trigger finger and thumb.

A further feature of the invention is that it protects the thumb from possible injury at the time of the explosion of the cartridges and also from the likelihood of injury at the time of explosion of a defective shell or cartridge in the cylinder.

In addition, the invention aids effective and satisfactory firing in that it provides a place for the thumb to rest on so that the thumb does not interfere with the hammer action, thus eliminating misfire.

Moreover, the invention serves to provide a proper rest for either a left or right handed person, affords a proper and comfortable grip and aids the shooter in using his thumb for snap shooting, particularly at night when it is practically impossible to clearly observe the sight on the revolver.

Other features and advantages of the invention will become more readily apparent from the following description and drawings.

Before introducing the detailed description of the invention, I wish to call attention to the fact that the inventive conception comprehends the provision of thumb guards and rests built into the revolver at the time of manufacture or made separately as attachments and applicable thereto, whereby to permit the devices to be applied to present-day marketed types of revolvers without requiring alterations of the existing or stock parts.

Figure 1:
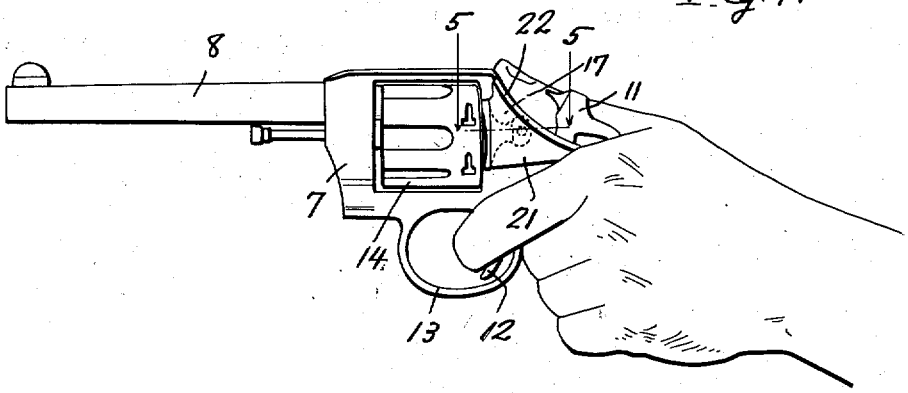
Figure 1 is a side elevational view of a pistol equipped with the invention showing the manner in which it is used.
Figure 2:
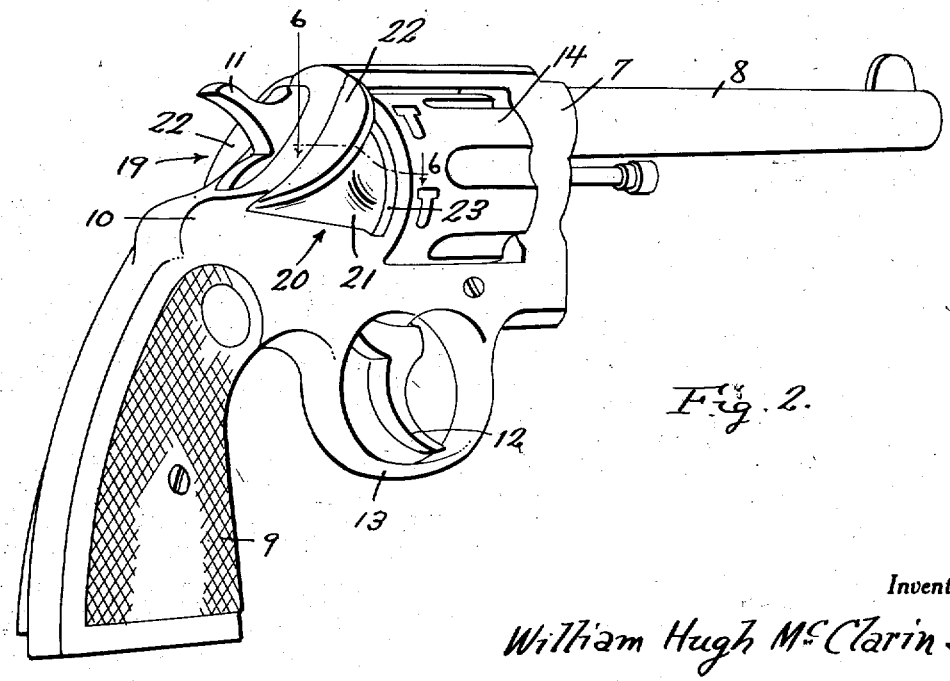
Figure 2 is a perspective view showing the invention in greater and enlarged detail.
Figure 4:
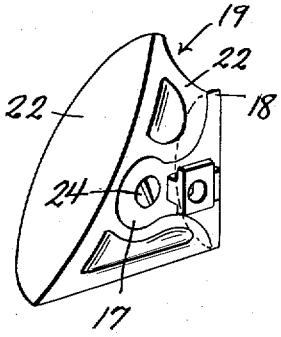
Figure 4 is a perspective view of one of the devices.
Figure 5:
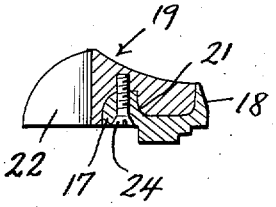
Figure 5 is a horizontal section taken approximately on the plane of the line 5—5 of Figure 1.
Figure 3:
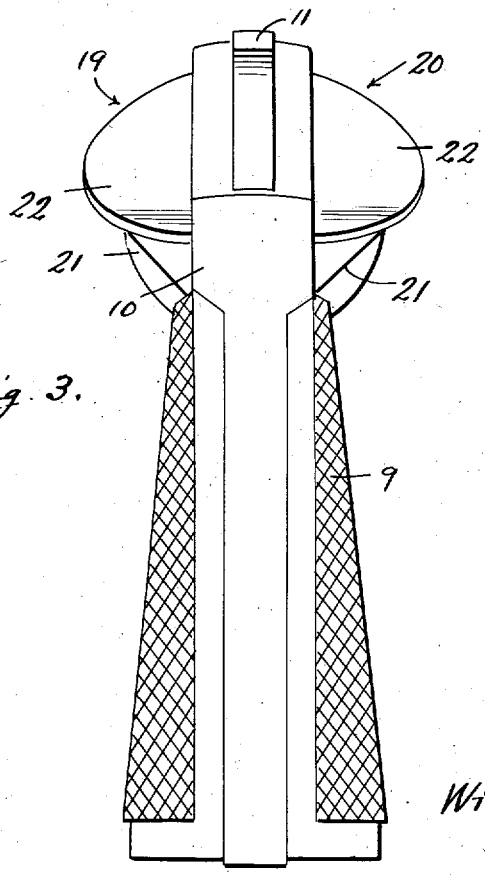
Figure 3 is a further exaggeration in size and proportions showing the duplicate construction of the thumb rest as visualized from the grip end of the revolver.
Figure 6:
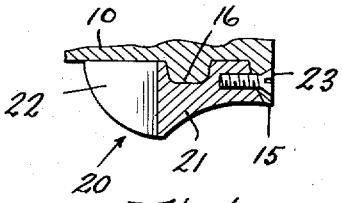
Figure 6 is a section taken approximately on the plane of the line 6—6 of Figure 2.

In the form of the invention disclosed in the drawings, a conventional revolver is shown and comprises, among other parts, a frame 7, a barrel 8, a hand grip 9, a shank 10 between the hand grip and frame, a hammer 11, a trigger 12, and a trigger guard 13, as well as the usual rotary cylinder or magazine 14. According to the usual construction, one flat face or side of the shank 10 is constructed as shown in Figure 6 and includes a flange 15 and an associated boss 16. On the opposite side of the shank is the usual latch 17 constructed with the customary abutment flange 18 as shown in Figures 4 and 5. As before indicated, I provide two units or devices and these are distinguished by the numerals 19 and 20, respectively. Each unit comprises a body portion 21 whose face is recessed or otherwise fashioned to correspond to the adjacent part of the shank 10, said body being formed with an integral flange 22 shaped to provide a concaved thumb rest. Otherwise stated, the body in Figure 6 has its inner face molded or cast to accommodate the parts 15 and 16. In fact, the flange 15 carries a screw 23 which serves to fasten this particular device 20 in secure position. In Figures 4 and 5 the body portion of the device 19 is likewise fashioned to accommodate the portions 17 and 18, a screw 24 being employed to secure the device 19 to the latch 17.

Generically, these devices 19 and 20 each include substantially duplicate portions 21 and 22 detachably secured to the existing parts on opposite sides of the shank 10 of the revolver, said devices serving as guards in the manner previously described and constituting firm and dependable rests for the thumbs of the hands of the users.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

I claim:

1. In a structure of the class described, in combination, a pistol including a frame, a barrel, a rotary cylinder mounted in said frame, and a grip attached to the frame through the medium of a relatively flat faced shank, and a combined thumb guard and rest secured on one side of the shank adjacent the inner end of said cylinder.

2. In a structure of the class described, in combination, a pistol including a frame, a barrel, a rotary cylinder mounted in said frame, and a grip attached to the frame through the medium of a relatively flat faced shank, and a combined thumb guard and rest secure on one side of the shank adjacent the inner end of said cylinder, together with a duplicate thumb guard and rest secured to the opposite side of the shank at the inner end of said cylinder.

3. In a structure of the class described, in combination, a pistol including a frame, a barrel attached to said frame, a grip attached to said frame through the medium of a curved shank, a rotary cylinder mounted in said frame, a cylinder retaining latch mounted on one side of said shank, a finger guard and rest including a body portion and a flange portion, said flange portion being shaped to accommodate the thumb, and a body portion having a flat face bearing against the adjacent flat face of said shank, said flat face being recessed to receive the latch therein, and means attaching said body to said latch.

4. In a structure of the class described, in combination, a pistol including a frame, a barrel attached to said frame in the usual way, a conventional rotary cylinder mounted in said frame, a trigger guard carried by the frame, a handgrip attached to the frame through the medium of the customary flat faced shank, and a pair of selectively usable rigidly attached thumb supports fastened to the aforesaid flat faces above the rear end portion of the trigger guard and in close proximity to the inner end of said cylinder, whereby to permit the handgrip to be conveniently grasped with the thumb occupying an extended position in substantial parallelism with said barrel in order that the grasp of the hand may be stabilized to permit the thumb pressure to be utilized to aid the index finger in positively actuating the trigger.

5. In a structure of the class described, in combination, a pistol including a frame, a barrel attached to and projecting outwardly from said frame, a rotary cylinder mounted in the frame, a trigger guard carried on the underside of the frame, a handgrip of conventional form attached to the frame through the instrumentality of the customary flat faced portion, a thumb receptive thrust flange, said flange projecting laterally from one side of the flat faced portion in close proximity to the inner end of the cylinder, said flange being shaped for convenient placement of the thumb in a position in approximate alinement with the barrel, said flange being proportioned to function as a protective shield, and means for removably securing the flange in operative position.

6. As a new product of manufacture, a pair of substantially duplicate devices adapted for attachment to opposite sides of a conventional pistol, each device embodying a thumb receptive flange shaped to conveniently support the thumb, the flange being adapted to occupy a position in close proximity to the inner end of the usual rotary cylinder, and being shaped to function as a thumb guard, and means for attaching the flange without requiring material alteration of the existing stock parts of a conventional pistol.

7. In a hand firearm, a thumb receptive flange in the vicinity of the breech, rigidly secured to and projecting laterally from the fire arm, said flange being at a considerable angle to the longitudinal axis of the barrel and inclined upwardly and forwardly, whereby in "squeeze" shooting the thumb exerts pressure both downwardly and in a forward direction, said flange extending from a point substantially below the level of the barrel forwardly and upwardly to a level at least as high as the barrel.

8. In a hand firearm, a thumb receptive flange disposed somewhat to the rear of the breech, rigidly secured to and projecting laterally from the fire arm, said flange being at a considerable angle to the longitudinal axis of the barrel and inclined upwardly and forwardly, whereby in "squeeze" shooting the thumb exerts pressure both downwardly and in a forward direction, said flange extending from a point substantially below the level of the barrel forwardly and upwardly to a level at least as high as the barrel.

WILLIAM HUGH McCLARIN, Sr.